J. LYNN.
TRANSMISSION CHAIN.
APPLICATION FILED JUNE 12, 1915.

1,185,336.

Patented May 30, 1916.

WITNESSES:
Edw. Thorpe.
Walton Harrison.

INVENTOR
John Lynn
BY Munn & Co
ATTORNEY

UNITED STATES PATENT OFFICE.

JOHN LYNN, OF ALICE, TEXAS.

TRANSMISSION-CHAIN.

1,185,336.  Specification of Letters Patent.  Patented May 30, 1916.

Application filed June 12, 1915. Serial No. 33,780.

*To all whom it may concern:*

Be it known that I, JOHN LYNN, a citizen of the United States, and a resident of Alice, in the county of Jim Wells and State of Texas, have invented a new and Improved Transmission-Chain, of which the following is a full, clear, and exact description.

My invention relates to transmission chains, that is, to devices made up of articulated parts but otherwise having the function of driving belts and used for transmitting power, usually from one revoluble member to another.

More particularly stated, my invention is a transmission chain made up of separate links, some of which are provided with spring material for centering the chain and for giving the latter increased flexibility, as well as for protecting objects disposed near or accidentally thrown into close proximity to the path of travel of the chain.

My invention further contemplates the provision of spring fingers carried by some of the chain links and so formed as to have a tendency to maintain the chain taut at all times and under practically all conditions of contact with the driving and driven members and to confer upon the chain a certain amount of elasticity as well as to keep the chain in such position that the strains transmitted by it are disposed centrally in relation to the driving and driven members.

Reference is made to the accompanying drawings forming a part of this specification, in which like figures indicate like parts in all the figures.

Figure 1:
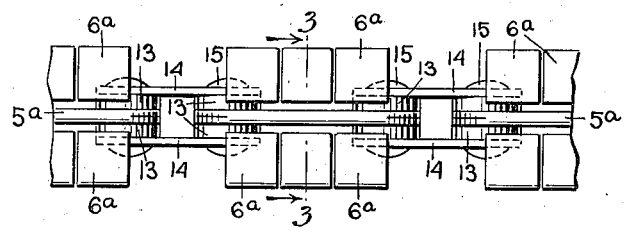
Figure 4:
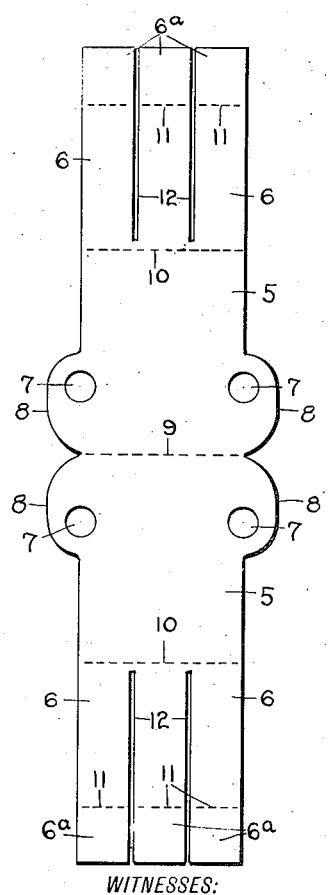
Figure 2:
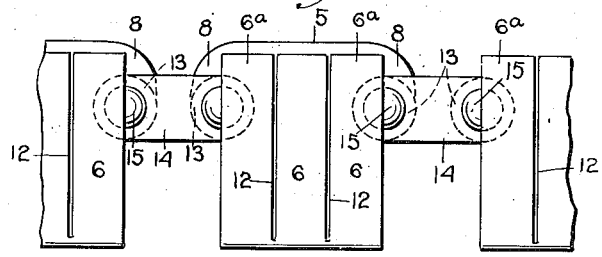
Figure 3:
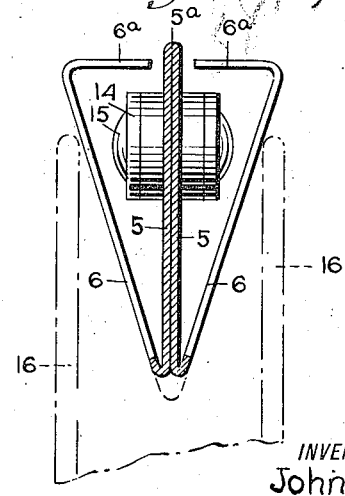

Figure 1 is a fragmentary plan view of a short portion of the chain; Fig. 2 is a fragmentary side elevation of the same; Fig. 3 is a section on the line 3—3 of Fig. 1 looking in the direction of the arrows; Fig. 4 is a plan view of the blank from which the spring mechanism of the chain link is formed.

The mechanism can best be understood by reference to the shape of the blank, which is shown in Fig. 4 and is preferably made in a single integral piece. Two panels 5 are provided with extending portions 6, there being three of these portions to each panel 5. Each panel is also provided with a pair of holes 7 and with a rounded portion 8 somewhat wider than the body portion of the panel. The blank is further provided with a score line 9 to facilitate bending the blank upon this line. The blank is further provided with score lines 10—11 and with slots 12, these slots being merely the spaces between the extending portions 6. The score lines 11 facilitate bending the extending portions 6 so as to form portions 6$^a$, as indicated more particularly in Fig. 3. When the blank is thus prepared it is bent along the score lines 9—10—11 and thus assumes the form indicated in Fig. 3. The two panels 5 are integrally united at 5$^a$. The portions 6 are now disposed at an angle relatively to each other and are adapted to serve the purpose of spring fingers. The portions 6$^a$ of these fingers extend directly toward adjacent portions of the panels 5. If now the spring fingers 6 be, from any cause, pressed toward the panels 5 the extending portions 6$^a$ lodge against the panels 5 and thus constitute a limiting stop for preventing undue movement of the spring fingers. An eye 13 having generally an annular form is now extended through each adjacent pair of the holes 7 and secured rigidly to the portions 8 of the panel by riveting, brazing, soldering, welding, or any other approved manner. This done the eyes 13, which are of massive construction, are well adapted to serve as bearings.

The parts thus far described constitute practically a single link and this link, because of its function, I conveniently designate as a spring link. It serves the purpose of an ordinary link and, besides, it carries the spring mechanism consisting of the spring fingers 6 with their extending portions 6$^a$. Extending between each consecutive pair of the spring links are ordinary flat links 14 which are pivoted to the spring links by aid of bolts 15. A pulley to be engaged by this transmission chain is shown at 16 in Fig. 3.

The transmission chain above described may be used in connection with pulleys having different peripheral form. In fact, the chain may be employed with almost any pulley having a peripheral groove for receiving a chain or belt. The blank shown in Fig. 4, and consequently the parts made of this blank, are of spring steel so that the various spring fingers and other extending portions have considerable resiliency.

The operation of my device is as follows: The parts being assembled and arranged as above described, the chain is mounted upon the pulleys with which it is to coöperate, the position of the chain relatively to each pulley being as indicated in Fig. 3. It will be noted that the spring fingers 6 engage the adjacent peripheral edges of the pulley so that when considerable strain is thrown upon the chain the links thereof tend to approach the center of rotation of the pulley. This causes the spring fingers 6 to bend toward the plane of rotation, and this bending continues until the portions 6ª lodge against the adjacent panels 5, or solid middle portion, of the link.

As may be understood from Fig. 2, the improved links have not only increased flexibility but also increased resiliency due to the fact that the adjacent extending portions 6ª of each link can move slightly apart at their outer ends. They can also move slightly toward each other toward their outer ends should occasion call for such movement. It will thus be noted that my improved spring links are very adaptable in that they can conform easily to different shapes of grooves in which they are used in connection with pulleys of different kinds. It will also be noted that for some purposes the link can virtually bend a little in the direction of its length, that is, consecutive spring fingers 6ª by moving toward and from each other can cause a slight yielding, the practical effect of which is not vastly different from what would take place should the link bend slightly in a plane coinciding with its length.

The transmission chain above described constitutes an efficient and reliable means for driving the fan of an automobile. The chain when in use does not deteriorate from the effects of oil and heat which are ever present. The chain can be used upon a pulley adapted for the ordinary so-called V-shaped belt. This transmission chain cannot stretch and its lost motion is reduced to a minimum. Having flexible and resilient contact with the pulleys the strains due to transmission are reduced to a minimum and are rendered substantially uniform.

I do not limit myself to the precise construction shown, as various changes may be made therein without departing from the spirit of the invention.

Having thus described my invention, what I claim as new and desire to secure by Letters Patent is:—

1. A blank for making a chain link, said blank comprising a pair of panels integrally connected together and provided with longitudinally extending slots disposed parallel with each other, said blank being further provided with a score line extending across said slots and with another score line extending across the body portion of the panel, said panels being further provided with holes.

2. A spring link comprising a single integral sheet of metal bent upon itself to form a central plate, the said plate being provided with eyes, said plate being further provided with spring fingers integral with it and diverging from each other, said spring fingers being provided with extending portions bent toward said plate and adapted to abut against the same when pressure is applied to said spring fingers.

3. A transmission chain comprising a plurality of links having diverging spring fingers integral therewith at the sides thereof and adapted to be bent toward the link proper when pressure is applied to the said fingers, and a plurality of connecting links, each of the first mentioned links being pivoted to a connecting link at each end.

4. A transmission chain comprising a centrally disposed plate provided with spring fingers diverging from it and from each other, said spring fingers being separated by slots and free to yield slightly in a direction across said slots, connecting links and means for connecting said centrally disposed plate with the said links in order to form a chain.

5. A device of the character described, comprising a plate formed of a sheet of material bent upon itself and provided with spring fingers, said spring fingers being arranged in two groups located upon opposite sides of the plate, the spring fingers on each side being separated by a slot, and links pivotally connected to said centrally disposed plate.

6. A transmission chain comprising a plurality of links provided with spring fingers integral therewith to give a flexible, yielding contact with surfaces of driving and driven members, and means for connecting the links to each other.

7. A transmission chain comprising links made of spring steel and means for connecting them together, said links each having spring fingers projecting outwardly from one edge thereof and presenting an elastic and yielding contact surface to the surface of a pulley.

In testimony whereof I have signed my name to this specification in the presence of two subscribing witnesses.

JOHN LYNN.

Witnesses:
WILLIS DILTS,
B. J. LYNN.